(12) United States Patent
Krasadakis

(10) Patent No.: US 10,775,882 B2
(45) Date of Patent: Sep. 15, 2020

(54) IMPLICITLY ADAPTIVE EYE-TRACKING USER INTERFACE

(71) Applicant: Microsoft Technology Licensing, LLC, Redmond, WA (US)

(72) Inventor: Georgios Krasadakis, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

(21) Appl. No.: 15/003,781

(22) Filed: Jan. 21, 2016

(65) Prior Publication Data

US 2017/0212583 A1  Jul. 27, 2017

(51) Int. Cl.
| | |
|---|---|
| *G06F 3/048* | (2013.01) |
| *G06F 3/01* | (2006.01) |
| *G06F 3/0482* | (2013.01) |
| *G06F 3/0485* | (2013.01) |
| *G06F 3/0484* | (2013.01) |
| *G06K 9/00* | (2006.01) |

(52) U.S. Cl.
CPC ............ *G06F 3/013* (2013.01); *G06F 3/0482* (2013.01); *G06F 3/0485* (2013.01); *G06F 3/04842* (2013.01); *G06K 9/0061* (2013.01)

(58) Field of Classification Search
CPC .... G06F 3/013; G06F 3/04883; G06F 3/0482; G06F 3/0485; G06F 3/048; G06K 9/00302

See application file for complete search history.

(56) References Cited

U.S. PATENT DOCUMENTS

| | | | |
|---|---|---|---|
| 8,510,166 B2 | 8/2013 | Neven | |
| 10,013,500 B1 * | 7/2018 | McClintock | ............ H04L 67/02 |
| 2006/0256133 A1 | 11/2006 | Rosenberg | |
| 2008/0147488 A1 | 6/2008 | Tunick et al. | |
| 2010/0007601 A1 | 1/2010 | Lashina et al. | |

(Continued)

OTHER PUBLICATIONS

Alt, et al., "Increasing the User's Attention on the Web: Using Implicit Interaction based on Gaze Behavior to Tailor Content", In Proceedings of 7th Nordic Conference on Human-Computer Interaction: Making Sense through Design, Oct. 14, 2012, pp. 544-553.

(Continued)

*Primary Examiner* — Jeanette J Parker

(57) ABSTRACT

A device is disclosed for enabling a user to navigate between content using gaze tracking. The device includes a presentation component for presenting a plurality of content to a user in user interface (UI) windows. A camera captures the gaze of the user, and components described herein control focus of the UI windows presented to the user based on the gaze. Multiple UI windows of varying content may be displayed to the user. A processor determines, from the captured gaze, where the user is looking, and the UI window located at the user's gaze point is brought into focus and controlled by the user's gaze. As the user looks to other UI windows, focus is seamlessly moved from one UI window to the next to correspond with what the user is looking at, providing an implicit way to control digital content without conventional computer commands, actions, or special requests.

18 Claims, 7 Drawing Sheets

(56) References Cited

U.S. PATENT DOCUMENTS

| | | | |
|---|---|---|---|
| 2011/0310001 A1* | 12/2011 | Madau | B60K 37/02 345/156 |
| 2012/0300061 A1* | 11/2012 | Osman | G06F 1/3231 348/135 |
| 2013/0246926 A1 | 9/2013 | Vemireddy | |
| 2013/0290094 A1 | 10/2013 | Srivastava et al. | |
| 2013/0307764 A1 | 11/2013 | Denker et al. | |
| 2013/0325463 A1 | 12/2013 | Greenspan et al. | |
| 2013/0340006 A1 | 12/2013 | Kwan | |
| 2014/0002352 A1 | 1/2014 | Jacob et al. | |
| 2014/0092006 A1 | 4/2014 | Boelter et al. | |
| 2014/0123162 A1 | 5/2014 | Karlsson et al. | |
| 2014/0191948 A1* | 7/2014 | Kim | G06F 3/0483 345/156 |
| 2014/0195918 A1 | 7/2014 | Friedlander | |
| 2014/0313120 A1 | 10/2014 | Kamhi | |
| 2015/0130703 A1 | 5/2015 | Ghajar | |
| 2015/0130716 A1* | 5/2015 | Sridharan | G06F 3/0304 345/158 |
| 2015/0269943 A1* | 9/2015 | VanBlon | G06F 3/013 704/275 |
| 2015/0331240 A1* | 11/2015 | Poulos | G02B 27/017 345/8 |
| 2016/0062452 A1* | 3/2016 | Kim | G06F 3/011 345/661 |
| 2016/0078848 A1* | 3/2016 | Tanaka | G06F 1/1686 345/684 |
| 2016/0225012 A1* | 8/2016 | Ha | G06Q 30/0242 |
| 2016/0328130 A1* | 11/2016 | Patel | G06F 3/013 |

OTHER PUBLICATIONS

Cheng, et al., "Adaptive User Interface of Product Recommendation based on Eye-Tracking", In Proceedings of Workshop on Eye Gaze in Intelligent Human Machine Interaction, Feb. 7, 2010, pp. 94-101.

* cited by examiner

IMPLICITLY ADAPTIVE EYE-TRACKING USER INTERFACE

BACKGROUND

Computers have traditionally incorporated user interfaces that utilize input devices, such as a mouse and keyboard. As computers have become more portable, however, the use of such input devices becomes less practical for users. One way to provide easier portable usage has been with touch screens. At the same time, the amount of content available to users online has increased dramatically, which has increased the difficulty for users to discover and consume desired content.

While modern portable computers, such as tablets and smart phones, now commonly incorporate touch screens, other types of hardware and software are emerging to enhance portability and usability. For example, built-in cameras are commonly included in portable computers for a variety of purposes. For example, built-in cameras provide video conferencing, which is now a popular way for users to communicate. In addition to communicating with other users, cameras are also increasingly used for authentication.

SUMMARY

The disclosed examples are described in detail below with reference to the accompanying drawing figures listed below. The following summary is provided to illustrate some examples disclosed herein, and is not meant to necessarily limit all examples to any particular configuration or sequence of operations.

Some examples are directed to controlling the display of content on a computing device through tracking of a user gaze. In some examples, a collection of digital content is presented to a user in user interface (UI) windows on a screen. Additionally, the gaze of the user is monitored and gaze points are tracked with respect to the content collection presented to the user based on the monitored gaze of the user. Some examples also display the UI windows that cover the gaze points in a focused manner. UI windows that are outside of the gaze points may also be presented in an unfocused manner. The user's focus may be tracked, and UIs may correspondingly be brought into and out of focus in a seamless manner that creates a user experience in which the user does not notice the unfocused UIs. For example, a user's gaze shifts from a first UI window to a second UI window. Prior to the gaze shift, the first UI window appears active to the user, such as being in color and/or in-focus, while the second window is grayscale and/or out-of-focus. With the gaze shift, the first UI window becomes grayscale and/or out-of-focus, while the second window comes into focus and/or is brought into color. In this example, the user is presented a seamless experience, where whatever is viewed becomes active, while UI windows not currently being viewed are inactive, and may thus be less distracting to the user.

In some examples, an in-focus UI window becomes active in promoting highly-related content to a user, which may include using animation techniques and optimal timings. The UI may advantageously adapt by becoming less distracting for the user and/or more interactive given specific item(s) of interest.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
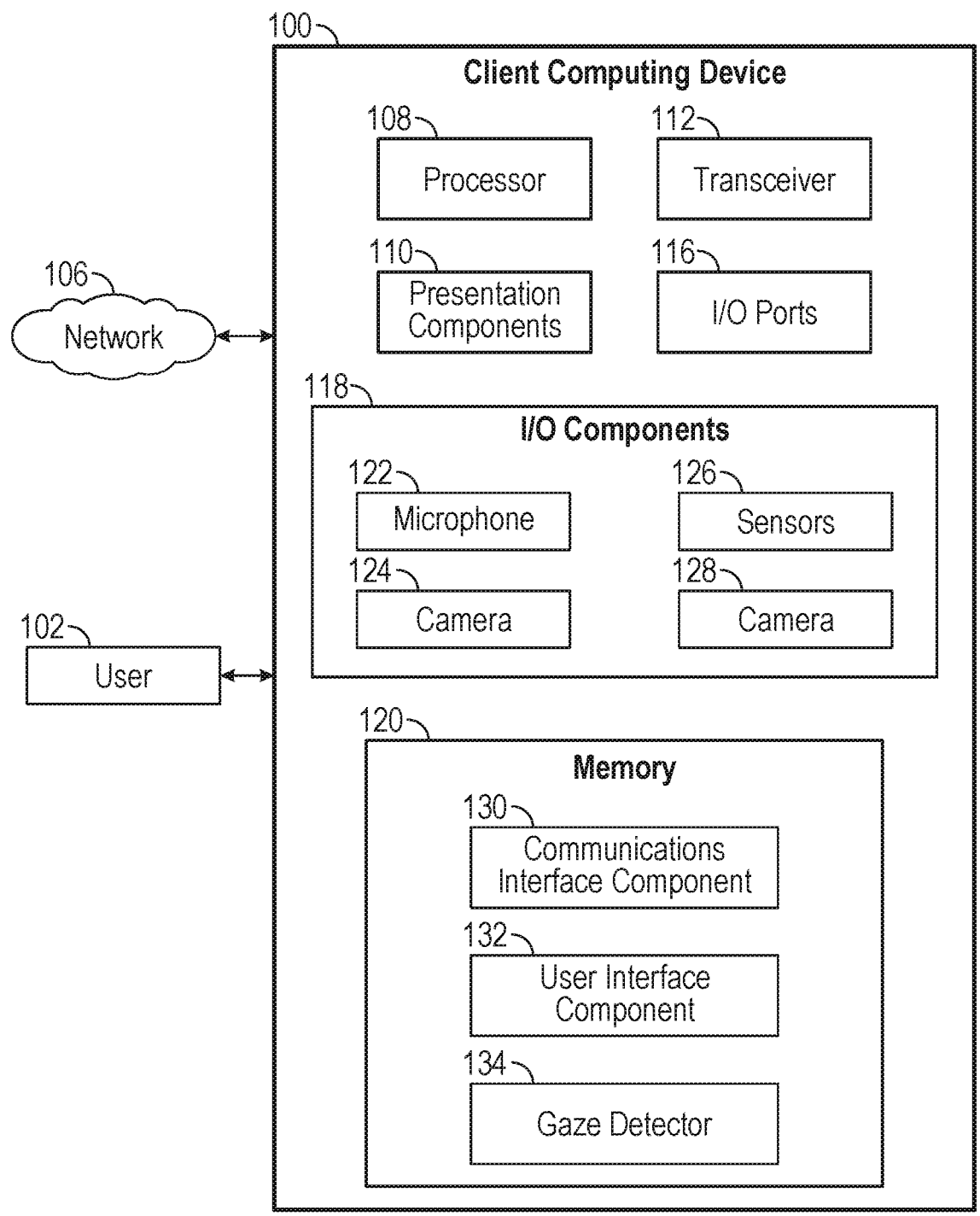
FIG. 1 is an exemplary block diagram illustrating a computing device for receiving user gaze input data.

Referring to the figures, examples of the disclosure enable a seamless and interactive eye-driven user experience. In some examples, one or more user interface (UI) windows are controllable by a user's gaze through tracking by a camera on a computing device. By continuously monitoring where the user is looking on a screen (for example), the location of the user's gaze may be estimated and/or determined. For example, a UI window may enter an active state once the user starts looking at it, and once the user looks away, the UI window may become inactive, at least unless/until the user looks at the UI window again.

While various examples dealing with UI windows coming into focus are provided, the disclosed examples are not limited to just activating and deactivating UI windows. Gaze analytics enable very useful data in analyzing the user's experience. For example, by displaying multiple UI windows related to a variety of topics, the topic(s) of most interest to the user may be determined by analyzing which UI windows are viewed, the duration of each view, the repetition of views, etc.

While historical data may be used to build a profile of a user's interests over time, targeted content may also be delivered without knowing anything about the user, such as a user's past sessions (if any). The interface may start tailoring content to an unknown user simply based upon the current selections the user is making. For example, a user's current viewing habits may not only reveal that the user likes sports content, but that when another UI window (even if inactive) displays a story about a particular football team, the user takes an interest in related topics (such as a type of car driven by a particular player on the football team displayed on another UI window) The interface may also make decisions about content based on data from other users, such as users whose profile have certain similarities.

Content may also be queued based on the user's actions. For example, while the user may see a collection of UI windows, each UI window may have a queue of content behind it, which may or may not be at least partially visible to the user. A UI window's content queue may be changed and updated at any time based upon the user's actions, which may be interpreted in view of previous actions, sessions, and/or historical data. The queuing of UI window content in some examples need not be noticeable by the user at all. The user may not notice that the content of the UI windows, as the user's gaze moves around over time, becomes more appealing and/or relevant according to the user's tastes and preferences.

Another feature provides auto-scrolling of content within a UI window. For example, a news story in a UI window captures the user's attention, who then starts reading the text. As the user's reading progresses, the text auto-scrolls, the speed of which may be based upon a variety of possible factors, such as the user's historical reading speed (including looking at how similar the content may be) and/or the actual current reading speed. If the user increases or decreases their reading speed, as discussed in more detail below, the UI window's auto-scrolling speed may adapt in real-time. Additionally, other media such as pictures and video, even if embedded with text, may become activated. For example, a picture may be enlarged if the user gazes upon it, a video may begin playing if it attracts a user's gaze, an audio file may begin playing upon viewing, an animation may start upon viewing, or the like. In some examples, as soon as content reaches the end, additional content shows up, part of the queue: navigation among content items. Some examples may utilize a fixed or variable time threshold to determine when additional content shows up, such as with a delay.

Another feature allows analysis of a user's reaction to content. For example, a user that is surprised or has some other emotional reaction may decrease their reading speed. The reading speed change may be in comparison to not only the current reading speed, but also for historical trends in the user's reading speed, which may also be known to vary by content category. This may allow particular passages or words to be associated with the user based on their interaction with text (or images or videos or other types of content). Other aspects for analysis include whether there is repetition (whether the user re-reads a particular word or portion of text) and patterns in the user's reading of various content. Such analysis may reveal the relevancy of the content being displayed or the reading skills of a particular user. For example, multiple users constantly re-reading an article may imply that the article is written in an advanced vernacular and thus would be better consumed if presented in simpler language. Some examples may be equipped to change the language of the article based on the implied re-reading of content determined from user gazes, either for a multitude of users (e.g., the article can be dynamically re-written for later consumption by all users) or for a specific user who is constantly re-reading the content. In this vein, textual content being presented to the users may be modified based on detected user(s) gaze movements. For example, an article may be presented in a modular fashion, such as on a per-paragraph (or any other suitable) basis. In turn, statistics (such as viewing/reading speed, re-reading, etc.) may be tracked not only for the article as a whole, but any subcomponent, such as separate statistics for different paragraphs. Some examples may track and/or deliver simpler paragraphs served to the user (quick titles and summaries) rather more detailed and complex paragraphs that are delivered to other users, depending on a user's engagement history, current reading statistics, patterns, etc.

Aspects of the disclosure further enable numerous technical advantages. For example, bypassing a user's hands/arms entirely provides a faster experience, faster input of data, and faster output based upon the user's faster input. Further, by eliminating the need for various input devices (mouse, keyboard, touchscreen), system memory may be conserved which would otherwise be required to run such devices and/or features, which may also improve performance of the operating system itself. In turn, eliminating the need for such devices also frees up processor resources, as a processor need no longer interact with such devices.

Another advantage provides for improved user and data security. In addition to providing biometric security through retinal scanning or other eye-recognition techniques, a user may more securely input data without typing on keys, which other individuals could watch to learn what is being input. For example, combining gaze control with a privacy screen, whereby others cannot view the screen from side angles, could further enhance the user's security and privacy.

Another advantage is improved accuracy, where many users would benefit from the accuracy of inputting information via their gaze, in contrast to typing on a keyboard (particularly if the user is not skilled at typing) or using a mouse. In addition, users struggling with a touchscreen (such as with a small touch screen on a smart phone) may benefit from improved accuracy. In some areas, such as with smart phones, the ability to make selections via gaze will greatly increase the ability to communicate with others phone-to-phone. Further still, removing the need for traditional input mechanisms may allow hardware to become miniaturized where they may then utilize a camera for gaze tracking over traditional input mechanisms. Additionally, gaze tracking may be utilized in combination with voice commands, which may be implemented/interpreted via natural language processing (NLP).

Referring again to FIG. 1, an exemplary block diagram illustrates a client computing device 100 configured to capture and transmit user and environmental data. The client computing device 100 represents any device executing instructions (e.g., as application programs, operating system functionality, or both) to implement the operations and functionality described herein associated with the computing device 100. In some examples, the client computing device 100 has at least one processor 108, one or more presentation components 110, a transceiver 112, one or more input/output (I/O) ports 116, one or more I/O components 118, and computer-storage memory 120. More specifically, the computer-storage memory 120 is embodied with machine-executable instructions comprising a communications interface component 130, a user interface component 132, and a gaze detector 134 that are each executable by the processor 108 to carry out disclosed functions below.

The client computing device 100 may take the form of a mobile computing device or any other portable device, such as, for example but without limitation, a mobile telephone, laptop, tablet, computing pad, netbook, gaming device, HoloLens, virtual reality (VR) device, and/or portable media player. The client computing device 100 may also include less portable devices such as desktop personal computers, kiosks, tabletop devices, industrial control devices, wireless charging stations, automated teller machines (ATMs), electric automobile charging stations, an electronic component of a vehicle (e.g., a vehicle computer equipped with cameras or other sensors disclosed herein), an electronically equipped toy (e.g., a stuffed animal, doll, or other child character equipped with the electrical components disclosed herein), or the like. Other examples may incorporate the client computing device 100 as part of a multi-device system in which two separate physical devices share or otherwise provide access to the illustrated components of the computing device 100.

The processor 108 may include any quantity of processing units, and is programmed to execute computer-executable instructions for implementing aspects of the disclosure. The instructions may be performed by the processor or by multiple processors within the computing device, or performed by a processor external to the computing device. In some examples, the processor 108 is programmed to execute instructions such as those illustrated in accompanying FIGS. 5-7. Additionally or alternatively, some examples may program the processor 108 present a seamless experience in a user interface ("UI"), e.g., the UI shown in FIGS. 3-4B. Moreover, in some examples, the processor 108 represents an implementation of analog techniques to perform the operations described herein. For example, the operations may be performed by an analog client computing device 100 and/or a digital client computing device 100.

The presentation components 110 visibly or audibly present information on the computing device 100. Examples of display devices 110 include, without limitation, computer monitors, televisions, projectors, touch screens, phone displays, tablet displays, wearable device screens, televisions, speakers, vibrating devices, and any other devices configured to display, verbally communicate, or otherwise indicate output to a user. The transceiver 112 is an antenna capable of transmitting and receiving radio frequency ("RF") signals. One skilled in the art will appreciate and understand that various antennae and corresponding chipsets may be used to provide communicative capabilities between the client computing device 100 and other remote devices. Examples are not limited to RF signaling, however, as various other communication modalities may alternatively be used.

I/O ports 116 allow the client computing device 100 to be logically coupled to other devices and I/O components 118, some of which may be built in to client computing device 100 while others may be external. Specific to the examples discussed herein, I/O components 118 include a microphone 122, a camera 124, one or more sensors 126, and a touch device 128. The microphone 1224 captures audio from the user 102. The camera 124 captures images or video of the user 102. The sensors 126 may include any number of sensors on or in a mobile computing device, electronic toy, gaming console, wearable device, television, vehicle, or other computing device 100. Additionally, the sensors 126 may include an accelerometer, magnetometer, pressure sensor, photometer, thermometer, global positioning system ("GPS") chip or circuitry, bar scanner, biometric scanner (e.g., fingerprint, palm print, blood, eye, or the like), gyroscope, near-field communication ("NFC") receiver, or any other sensor configured to capture data from the user 102 or the environment. The touch device 128 may include a touchpad, track pad, touch screen, other touch-capturing device capable of translating physical touches into interactions with software being presented on, through, or by the presentation components 110. The illustrated I/O components 118 are but one example of I/O components that may be included on the client computing device 100. Other examples may include additional or alternative I/O components 118, e.g., a sound card, a vibrating device, a scanner, a printer, a wireless communication module, or any other component for capturing information related to the user or the user's environment.

The computer-storage memory 120 includes any quantity of memory associated with or accessible by the computing device 100. The memory area 120 may be internal to the client computing device 100 (as shown in FIG. 1), external to the client computing device 100 (not shown), or both (not shown). Examples of memory 120 in include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the client computing device 100. Memory 120 may also take the form of volatile and/or nonvolatile memory; may be removable, non-removable, or a combination thereof; and may include various hardware devices (e.g., solid-state memory, hard drives, optical-disc drives, etc.). Additionally or alternatively, the memory 120 may be distributed across multiple client computing devices 100, e.g., in a virtualized environment in which instruction processing is carried out on multiple devices 100. For the purposes of this disclosure, "computer storage media," "computer-storage memory," and "memory" do not include carrier waves or propagating signaling.

The computer-storage memory 120 stores, among other data, various device applications that, when executed by the processor 108, operate to perform functionality on the computing device 100. Examples of applications include gaze detector applications, instant messaging applications, electronic-mail application programs, web browsers, calendar application programs, address book application programs, messaging programs, media applications (e.g., content browsing applications, news sites/portals, various media types), location-based services, search programs, and the like. The applications may communicate with counterpart applications or services such as web services accessible via the network 106. For example, the applications may include client-operating applications that correspond to server-side applications executing on remote servers or computing devices in the cloud.

Specifically, instructions stored in memory 120 comprise a communications interface component 130, a user interface component 132, and a gaze detector 134. In some examples, the communications interface component 130 includes a network interface card and/or a driver for operating the network interface card. Communication between the client computing device 100 and other devices may occur using any protocol or mechanism over a wired or wireless connection, or across the network 106. In some examples, the communications interface component 130 is operable with RF and short-range communication technologies using electronic tags, such as NFC tags, BLUETOOTH® brand tags, or the like. In some examples, the communications interface component 130 communicates with a remote content store, which may be in a remote device (such as a server) or cloud infrastructure. The remote content store, for example, may receive, store, and send data related to content analytics, user analytics, and/or pattern data (which may relate to one or more users).

In some examples, the user interface component 132 includes a graphics card for displaying data to the user and receiving data from the user. The user interface component 132 may also include computer-executable instructions (e.g., a driver) for operating the graphics card to display gaze detector responses (which may include updating the UI context) and corresponding images or audio on or through the presentation components 110. The user interface component 132 may also interact with the various sensors 126 to both capture and present information through the presentation components 110.

The gaze detector 134, when executed, receives visual data through the camera 124 and/or sensors 126, where the visual data may include a user's gaze. The terms "gaze detector" and "gaze locator" may be used interchangeably throughout. The gaze detector 134 detects the user's eyes (shown below in 103 FIG. 3) or a particular portion thereof, such as the pupil, cornea, iris, sclera, etc. Other examples use the camera 124 and/or 126 sensors to capture the user's 102 body position, motions, and/or facial expressions.

The camera 124 may estimate the exact area of the presentation component 110 (here a screen, for example, and referred to below as screen 110) at which the user 102 is looking. In some examples, the gaze detector 134 extrapolates the user's gaze to position coordinates with respect to the screen 110. The terms coordinates, pixels, and gaze points may be used interchangeably throughout. In this example the gaze detector 134 receives and updates gaze information in a continuous and real-time manner. Other examples utilize the gaze detector 134 to obtain gaze information continually, periodically, aperiodically, intermittently, at intervals, and/or in a delayed manner.

In some examples, the gaze data is processed within the client computing device 100. Other examples may provide for gaze data (or any other data) to be processed remotely, such as over the network 106. Based upon the gaze data, as discussed below in more detail, the user interface component 132 displays data (such as web content) and may communicate the retrieved user and environmental data over the network 106 to remote devices, such as devices that host the content store, which in turn may communicate data back to the client computing device 100 or presentation component 110.

In some examples, the user interface component includes a graphics processor for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include and/or interface with one or more of the following to provide data to the user or receive data from the user: speakers, a sound card, a camera, a microphone, a vibration motor, one or more accelerometers, a BLUETOOTH® communication module, global positioning system (GPS) hardware, and a photoreceptive light sensor. For example, the user may input commands or manipulate data by moving the computing device in a particular way.

The term "Wi-Fi" as used herein refers, in some examples, to a wireless local area network using high frequency radio signals for the transmission of data. The term BLUETOOTH® as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Figure 2:
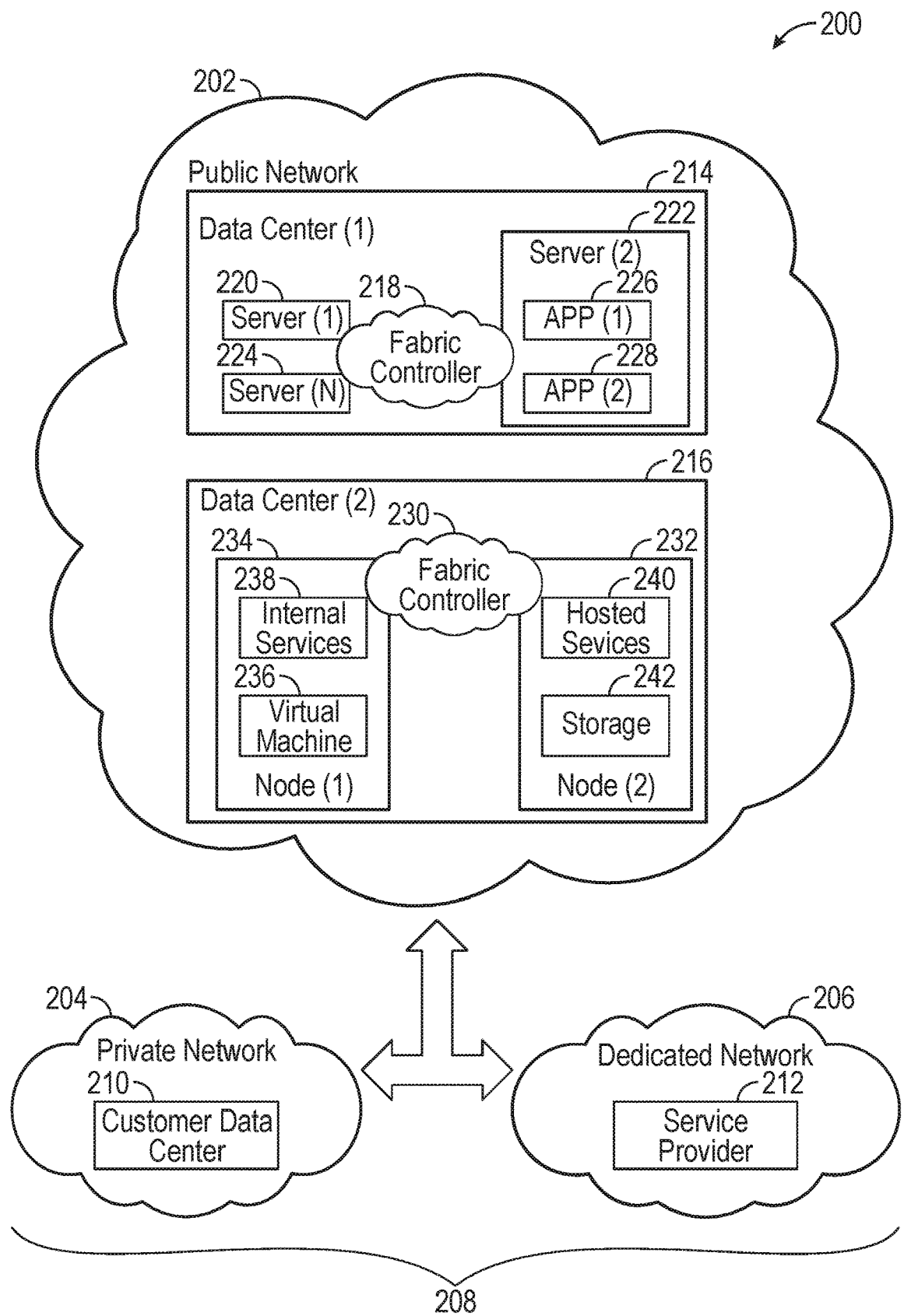
FIG. 2 is an exemplary block diagram illustrating a networking environment for distributing and utilizing user gaze input data.

Turning now to FIG. 2, an exemplary block diagram illustrates a cloud-computing environment for pulling content from client devices and sending data to client devices, such as for an adaptive eye-tracking user interface. Architecture 200 illustrates an exemplary cloud-computing infrastructure, suitable for use in implementing aspects of the disclosure. Architecture 200 should not be interpreted as having any dependency or requirement related to any single component or combination of components illustrated therein. In addition, any number of nodes, virtual machines, data centers, role instances, or combinations thereof may be employed to achieve the desired functionality within the scope of examples of the present disclosure.

The distributed computing environment of FIG. 2 includes a public network 202, a private network 204, and a dedicated network 206. Public network 202 may be a public cloud, for example. Private network 204 may be a private enterprise network or private cloud, while dedicated network 206 may be a third party network or dedicated cloud. In this example, private network 204 may host a customer data center 210, and dedicated network 206 may host an internet service provider 212. Hybrid cloud 208 may include any combination of public network 202, private network 204, and dedicated network 206. For example, dedicated network 206 may be optional, with hybrid cloud 208 comprised of public network 202 and private network 204.

Public network 202 may include data centers configured to host and support operations, including tasks of a distributed application, according to the fabric controller 218. It will be understood and appreciated that data center 214 and data center 216 shown in FIG. 2 is merely an example of one suitable implementation for accommodating one or more distributed applications and is not intended to suggest any limitation as to the scope of use or functionality of examples of the present disclosure. Neither should data center 214 and data center 216 be interpreted as having any dependency or requirement related to any single resource, combination of resources, combination of servers (e.g. server 220, server 222, and server 224) combination of nodes (e.g., nodes 232 and 234), or set of APIs to access the resources, servers, and/or nodes.

Data center 214 illustrates a data center comprising a plurality of servers, such as server 220, server 222, and server 224. A fabric controller 218 is responsible for automatically managing the servers and distributing tasks and other resources within the data center 214. By way of example, the fabric controller 218 may rely on a service model (e.g., designed by a customer that owns the distributed application) to provide guidance on how, where, and when to configure server 222 and how, where, and when to place application 226 and application 228 thereon. In one example, one or more role instances of a distributed application, may be placed on one or more of the servers of data center 214, where the one or more role instances may represent the portions of software, component programs, or instances of roles that participate in the distributed application. In another example, one or more of the role instances may represent stored data that is accessible to the distributed application. In some examples, one or more data centers 214 may act as a content store by storing content in various forms and/or content metadata, including gaze analytics at the content level to generate personalized user experiences.

In some examples, application 226 on server 222 may build a user profile based upon the activity of the user of the client 100. For example, the gaze of the user may be tracked, as discussed in more detail below. In various examples, eye movement of a user may be tracked, along with a variety of related data, such as gaze duration, speed of eye movement, how quickly attention is shifted, and so on. Gaze analytics based upon eye movement may be added to a user's profile. Additionally, the context of gaze data may also be interpreted and/or added to a user's profile, such as analyzing the context of the content. For example, the application 226 may aggregate data for a user's profile that the user gazed upon a window for a particular duration of time, and then switched to another window. Continuing with this example, context data may also be added to the user's profile based upon the user having first viewed a news story that mentions a type of car, and then having viewed the second window which also features a car of the same brand. Additionally, content queued for the user may be updated at any time based upon such information, which may be stored and/or received at the application 226.

When a user is looking at an image, gaze analytics may be associated with specific image properties (size, landscape, contrast, palette, etc.) along with the entities appearing in the image (persons, named/famous persons, locations, landmarks, etc.), as well as with any other metadata associated with the image, and may also apply to videos/animations as well. In this example, accumulated metrics (gaze analytics) may empower statistical analysis which may then used for advanced personalization and adaptation to user needs. Additionally, telemetry data may be captured/analyzed from any user's session. Examples include what a user is looking at, what succeeds to attract a user's attention, what fails (both UI elements within a UI window and at a content level, such as specific content items presented through the UI). Additional examples of telemetry data include how many times, how fast, and/or what pattern a user used to read through a specific sentence (or other portions of content). Continuing with that example, this data could be translated in to readability score (regarding the user and/or the text). In another example, cross-page and/or cross-session content (such as news and/or fiction stories) may be formulated based on specific attention-received patterns.

In some examples, application 228 on server 222 may generate and/or queue content for the user of client 100 based upon a comparison of the user's profile with the profiles of other users stored in, or accessed by, application 222. For example, the user's demographic data (age, gender, race, location, etc.) may be compared to the profiles of other users whose profiles share similar characteristics. In various examples, any suitable criteria may be utilized to determine what content may be most relevant and/or desirable for the user based upon the profiles of similar users. For example, if the user gazes upon content featuring certain types of stocks, then other content (even if seemingly unrelated) such as political articles or technology gadget updates may be delivered and/or queued. A relation may used, being based upon users in the same age range and geographic region who have expressed an interest in such stocks, having profile and relational data that indicates a tendency to have an interest in politics or technology gadget updates. Relational data may be store and/or utilized in the application 228 (or any other remote location/device) and/or on the client 100. In some examples, non-relational data can be stored as well in the form of serialized objects, document objects, binary data, XML, JSON, BLOBS etc.

Data center 216 illustrates a data center comprising a plurality of nodes, such as node 232 and node 234. One or more virtual machines may run on nodes of data center 216, such as virtual machine 236 of node 234 for example. Although FIG. 2 depicts a single virtual node on a single node of data center 216, any number of virtual nodes may be implemented on any number of nodes of the data center in accordance with illustrative examples of the disclosure. Generally, virtual machine 236 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine 236 may include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of data center 216 and for placing the role instances and other resources (e.g., software components) within the data center 216. By way of example, the fabric controller 230 may rely on a service model (e.g., designed by a customer that owns the service application) to provide guidance on how, where, and when to configure the virtual machines, such as virtual machine 236, and how, where, and when to place the role instances thereon.

As discussed above, the virtual machines may be dynamically established and configured within one or more nodes of a data center. As illustrated herein, node 232 and node 234 may be any form of computing devices, such as, for example, a personal computer, a desktop computer, a laptop computer, a mobile device, a consumer electronic device, server(s), the computing device 100 of FIG. 1, and the like. In one instance, the nodes host and support the operations of the virtual machines, while simultaneously hosting other virtual machines carved out for supporting other tenants of the data center 216, such as internal services 238 and hosted services 240. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role instances that reside on the nodes support operation of service applications, and may be interconnected via application programming interfaces (APIs). In one instance, one or more of these interconnections may be established via a network cloud, such as public network 202. The network cloud serves to interconnect resources, such as the role instances, which may be distributably placed across various physical hosts, such as nodes 232 and 234. In addition, the network cloud facilitates communication over channels connecting the role instances of the service applications running in the data center 216. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Figure 3:
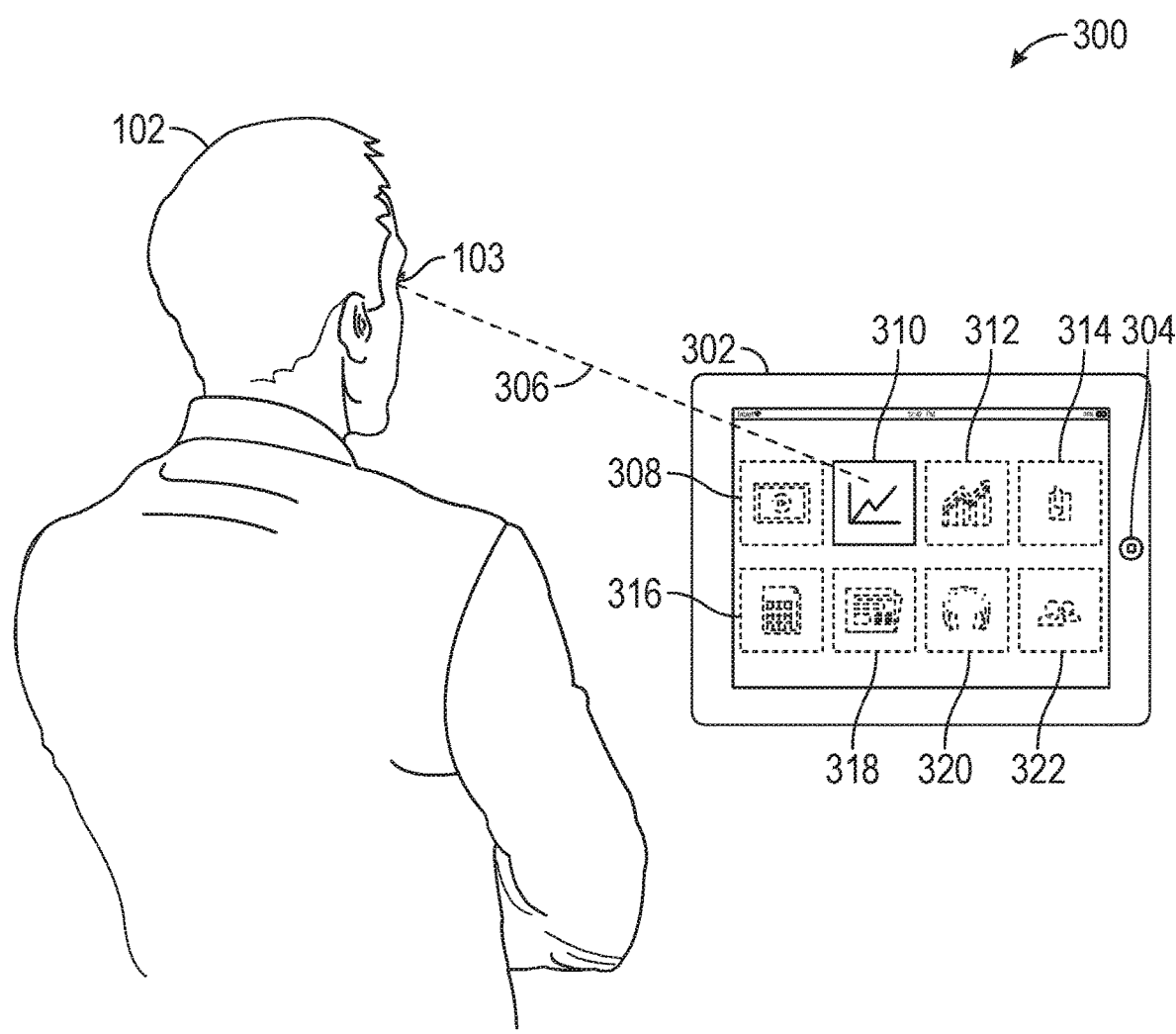
FIG. 3 is an exemplary diagram depicting an over-the-shoulder view of a device receiving user input gaze.

FIG. 3 illustrates a block diagram 300 where a device 302 utilizes a camera 304 to track a user's gaze 306 by monitoring the eyes 103 of the user 102. Any part of a user's eyes (pupil, retina, iris, sclera, etc.) may be monitored. Any number of eyes 103, such as one or both, may serve to represent a user's gaze 306. In some examples, eyes 103 from different individuals or entities may be monitored together, such as for collaborative gazing. Additionally, gaze points may be based on gaze direction determined through facial recognition, either in conjunction with the eye detection or independent thereof.

As discussed above, any type of camera 304 (webcam, light-field camera, zoom-lens, 3-d camera, Kinect®, RealSense, etc.) or sensor (infrared, etc.) may be used to monitor a gaze 306. The gaze 306 may be captured in real-time, delayed, archived, etc. For digital video examples, some or all of the frames of the gaze monitoring may be utilized. Blinking may be ignored based upon any type of suitable threshold of blink time occurring at an interval. Additionally, the device 302 may be any type of display, such as a touch screen, holographic display, or virtual display.

In some examples, UI windows 308, 310, 312, 314, 316, 318, 320, and 322 are displayed on the device 302. The camera 304 detects the gaze 306 from the eyes 103 of the user 102. Here, the user 102 has a gaze 306 fixed upon UI window 310, depicted as containing a report. Continuing with this example, the gaze 306 causes the UI window to come into focus. By contrast, the other UI windows 308, 312, 314, 316, 318, 320, and 322 are not in focus (i.e., focus is suspended). In this example, these UI windows are depicted in a blurred manner (i.e., being out-of-focus). In other examples, the UI windows not being gazed upon may utilize any type of indicator that they are not in focus (such as being in grayscale, shrunk, static/inanimate, etc.). In some examples, initially there are no UI windows in focus; whereas, other examples may automatically bring one or more UI windows into focus based upon random selection or any suitable factors such as a user's 102 history or newsworthiness. When a gaze 306 shifts to a UI window (also known as an on-focus event), the interface may smoothly suspend any other content and/or activity (such as animation to promote content or navigate through content) previously active in a different UI window (or elsewhere on the screen). Continuing with this example, the interface may smoothly initiate animation for the on-focus event, along with serving related content sequentially while user interactions are being captured.

In some examples, gaze analytics may be generated, either on the client device itself or by a remote device (e.g., a backend server), and used to personalize the user experience. Gaze analytics may be generated, for example, by analyzing the time a user spends on a particular portion of a UI window, such as a pause or slow-down for specific text or a graphic. The pause or slow-down may be measured against other such instances to build associations with respect to a profile associated with the user profile, regardless of whether there may already be historical data from previous sessions or not. For example, a user's interest in automobiles (e.g., a particular car or a car brand) may be reflected with an update to the user's profile based upon this information, such as where a user slows their content viewing upon seeing a particular car mentioned, photographed, or appearing in a video. Videos or audio may be paused or removed if a user gazes away, although some examples provide that the video or audio resumes upon the gaze returning. In some examples, advertisements may also be provided using any of the techniques provided herein.

Another example utilizes gaze analytics for the UI arrangement itself, such as where the interface may know that the specific user tends to focus on top-right corner (for any reason independent of the content served to the user). In this example, the interface may promote the most relevant and potentially valuable content for the specific user, such as to the top-rightmost elements of the UI. In another example, the interface may test (A/B testing) specific structural alternatives of the overall UI (for instance, how many UI windows fit a screen/display area, UI window size, vertical vs. horizontal, etc). Testing may also be executed to determine from a number of UI alternatives which one(s) may (or are most likely to) attract higher levels of user attention/engagement, such as through gaze-driven content experiences.

In some examples, gaze data may be translated into interest levels in content (regarding specific and/or groups of content). For example, a longer gaze on a piece of content may translate into a higher content interest level than a shorter gaze. Additionally, various weighting criteria may be utilized. For example, a user whose profile is deemed highly relevant may be afforded more weight in affecting the interest profile of a content item as compared with a user whose profile is deemed less relevant. Continuous measurement of interest may be performed across a user's session and/or with respect to specific UI elements and/or content items, including (but not limited to) sentiment capture/analysis/modeling.

Additionally, a user profile, including but not limited to historical and/or session data, may include data derived across other platforms, software, and input mechanisms (such as mouse, keyboards, touch screen, etc.) to develop a more accurate and robust user profile. For example, a user's prior keyboard/mouse and touch screen profile data may be used to display tailored content in UI windows and/or place tailored content in the UI windows queues, and/or vice versa.

The content of UI windows 308, 310, 312, 314, 316, 318, 320, and 322 may change or rotate based upon any number of factors. As discussed below, content in a UI window may auto-scroll upon receiving a gaze. Additionally, media (such as videos or audio files) may await a gaze in order to begin playing, or may play without sound, and/or at a smaller size. In these examples, a gaze could activate the video playing, initiate the video's sound, and/or increase the video's size. In other examples, a web link (or uniform resource locator (URL) or similar resources) may be selected and/or visited upon receiving a gaze, which may include additional logic, such as at least x milliseconds of duration and/or combined with a voice command (such as with NLP). For example, a URL/hyperlink that receives a gaze for a particular content item may be utilized to trigger specialized prompts (micro-animated, inline panels, etc.) that provide the user with the ability to view more information regarding the content item that was or is still being gazed.

The UI windows 308, 310, 312, 314, 316, 318, 320, and 322 may have additional content queued behind the current content being displayed in the UI window. For example, while UI window 310 may currently display a financial report, content from additional categories or topics (sports, news, cars, etc.) may be queued up 'behind' the current content, such as in UI window 310. The content of one or more UI windows (including queued content) may be stored locally or obtained remotely, such as from the cloud or a server (or group of servers). A user's gaze, even without historical data, may be used to begin customizing the user experience. For example, a new user with no data may gaze upon a news story, and when the story ends, the gaze shifts to a UI window with content about a particular car. A profile may be built as soon as the user begins gazing upon content. Additionally, gaze data relative to the location of updated content may be analyzed. Content in the queue may be brought to the forefront of a UI window, removed from the forefront, moved forward or backward in the queue, and/or removed entirely from the queue. The content within a queue may be adapted in real-time as the user interacts with one or more UI windows. In addition, just-in-time operations among queues may be implemented. For example, where a user focuses on specific type of content, the overall set of content across queues may self-organize to better satisfy the implied preferences of the user.

Additionally, if content the user was previously viewing (but the user's gaze shifted away) is suddenly obscured, the gaze location may be stored for future use should the gaze return to the UI window. The interface described herein may be implemented at the operating system level, built into web browsers, apps for smart devices, stand-alone software, or built-in with respect to hardware (such as a camera).

Figure 4A:
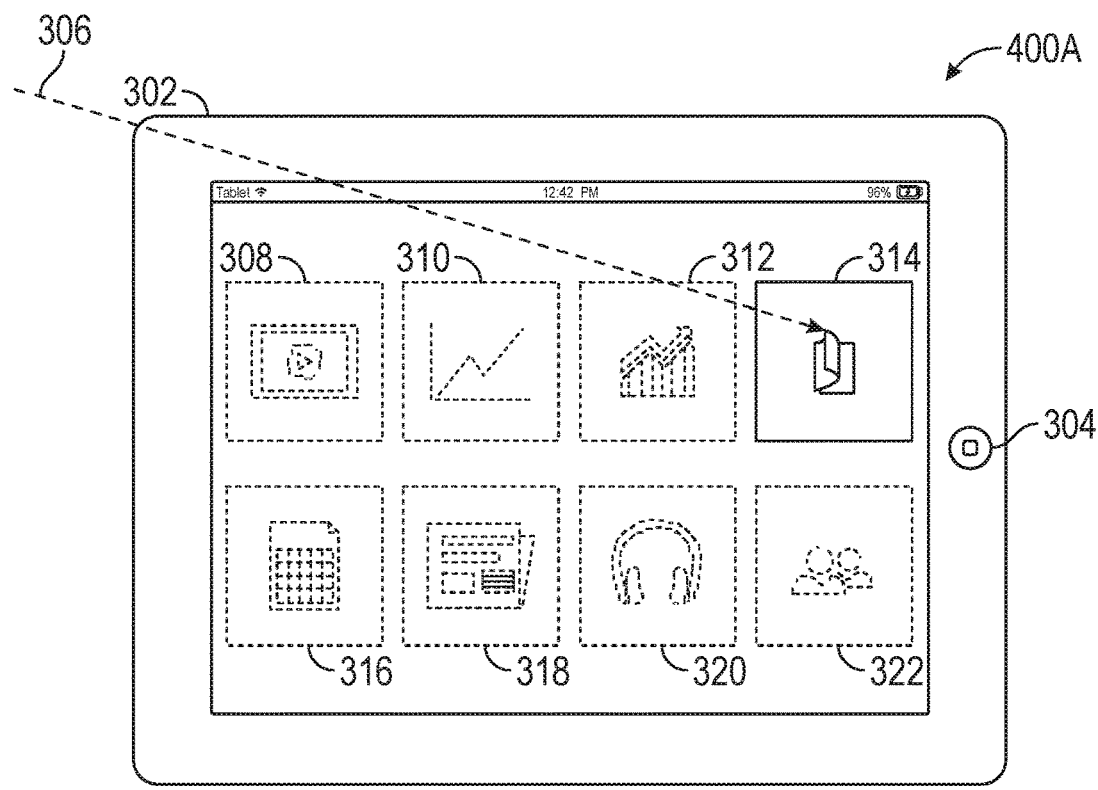
FIG. 4A is an exemplary diagram depicting user gaze input being received to interact with an interface window.

FIG. 4A illustrates a block diagram 400A of the device 302 whose camera 304 monitors the location of the user's gaze 306. Here, the user's gaze 306 has switched from UI window 310 displaying a report to UI window 314 where a text document is being accessed. The previously-gazed UI window 310 is no longer in focus. In this example, the report in UI window 310 may animate, such as showing computations and a graph being updated (upon coming into focus) to show the evolution of the data. Some examples may restrict the animation to only data that was updated since previously going out-of-focus.

In some examples, if the gaze is removed, the report may instantly revert to an out-of-focus state. In other examples, if the gaze is removed, the report may regress to an out-of-focus state in an animated fashion. In some examples, a confirmation indicator may also be displayed to warn the user that UI window 310 will revert to an out-of-focus state within a certain amount of time. Additionally, a warning may be displayed that the previous state of the UI window may be lost if the windows goes out-of-focus.

Figure 4B:
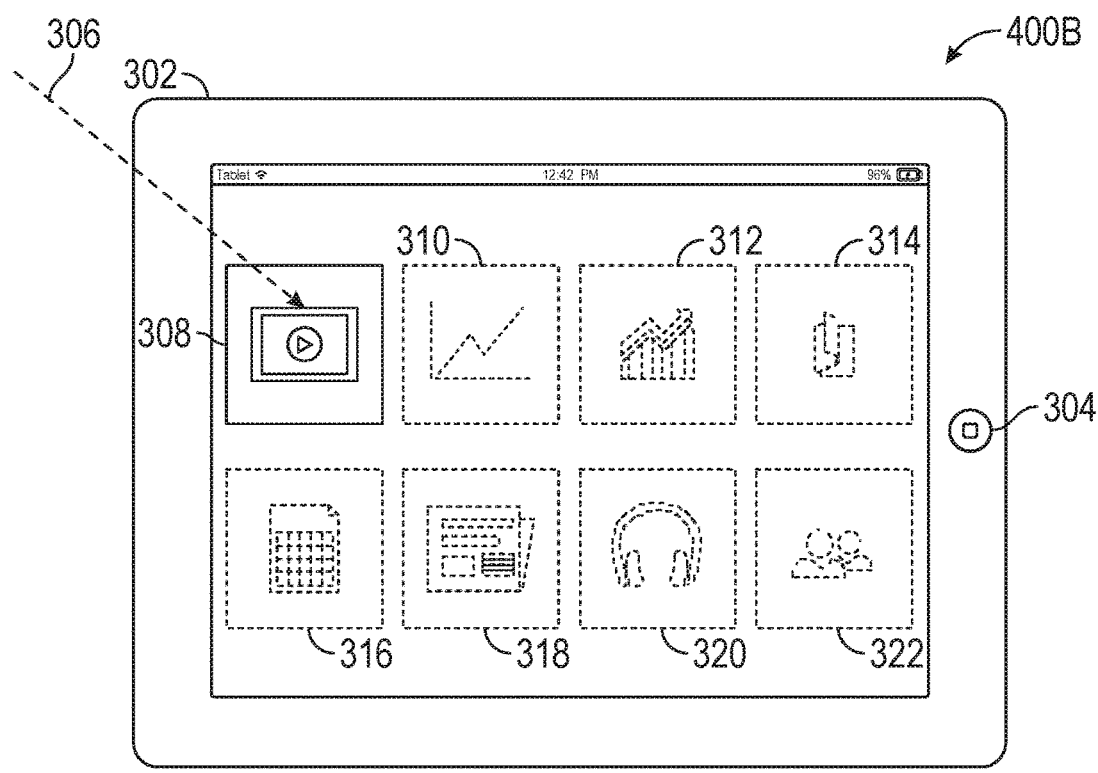
FIG. 4B is an exemplary diagram depicting user gaze input being received to activate another interface window.

FIG. 4B illustrates a block diagram 400B utilizing the device 302 whose camera 304 monitors a user's shifted gaze 306 where the user's gaze 306 has switched to UI window 314 where a text document is accessed, while the previously-gazed UI window 314 Window is no longer in focus. Additionally, UI window 314 may retain the last location within the document if the window goes out-of-focus.

Upon coming back into focus, UI window 314 may resume the last location within the document if the window comes back into focus again, upon receiving the user's gaze again. Other examples may revert UI window 314 back to the beginning of the document, or some other default location. Other examples may revert UI window 314 to one of one or more 'checkpoint' locations based upon a previously-viewed location within the document, or at a location close to where the gaze ended (even if the checkpoint location is further than the user's gaze had previously reached).

Figure 5:
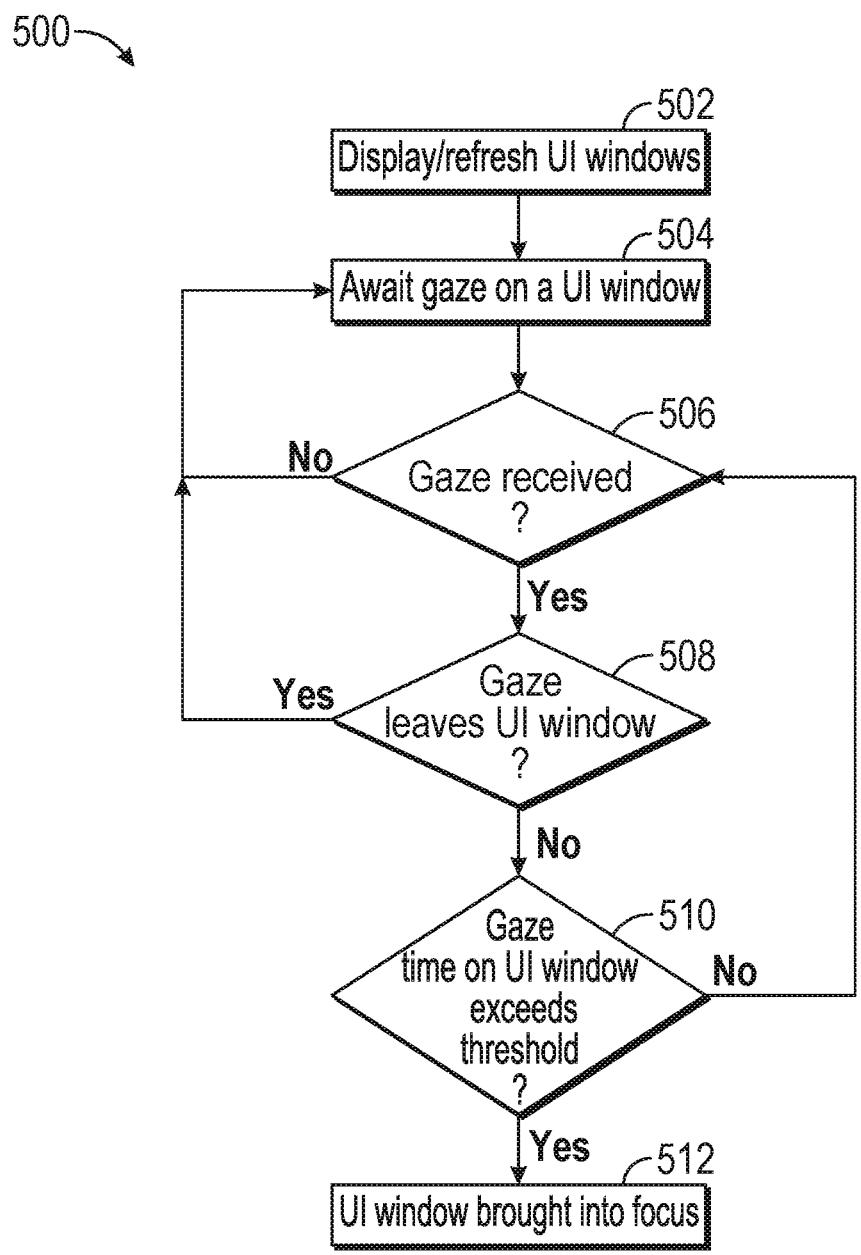
FIG. 5 is an exemplary flow chart illustrating operation of a computing device to bring an interface window into focus.

FIG. 5 is a flow chart diagram that illustrates utilizing a user's gaze to bring a UI window into focus. As shown at block 502, a collection of UI interfaces are displayed or refreshed. A user's gaze is tracked by the gaze detector 134. A gaze upon one of the UI windows is awaited until a gaze is received, as shown at block 504. The gaze detector 134 checks—either periodically or conditionally—to see whether a gaze has been received. If not, the gaze detector 134 continues to wait, as shown at block 504. Once a gaze has been received on a UI window, as shown at block 506, a check is performed to see whether the user gaze has left the UI window, as shown at block 508. The length of the user's gaze may be used, for example, to differentiate a quick glance from a longer gaze.

If the gaze leaves the UI window, the interface returns to awaiting a gaze back at block 504. If the gaze does not leave the UI window, the gaze detector 134 performs a check to see whether a threshold amount of time has elapsed, as shown at block 510. If the threshold amount of time has not yet been met, the gaze detector 134 returns to block 506 to make sure that the gaze does not leave the UI window prior to the threshold amount of time. If the threshold amount of time has been met, the UI window is brought into focus or activated. For example, the threshold amount of time may be utilized to make sure the UI window is not taken out of focus due to, for example, blinking or an inadvertent dart of the eyes.

Figure 6:
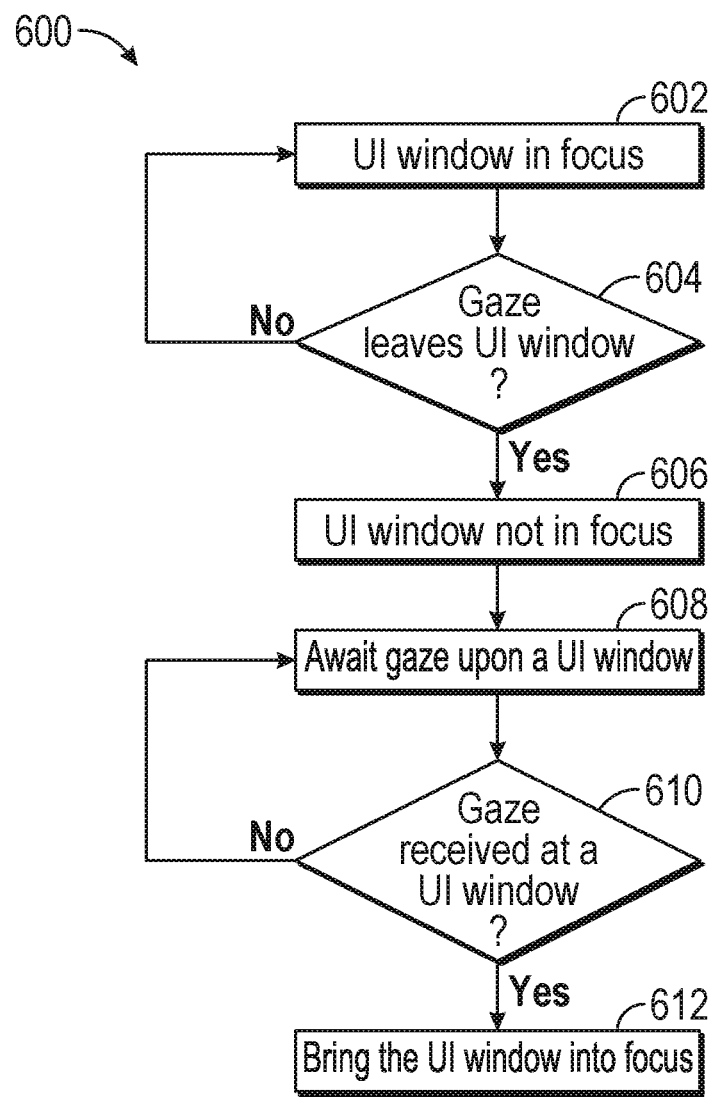
FIG. 6 is an exemplary flow chart illustrating operation of a computing device to change the interface window in focus.

FIG. 6 is a flow chart diagram that illustrates changing the focus among UI windows based upon a change in user gaze. As shown at block 602, a UI window is in focus. As shown at block 604, a check is performed to see whether the gaze has left the card in focus. If the gaze has not left the UI window, the interface returns to analyzing the UI window in focus as shown at block 602. If the gaze leaves the UI window at 604, the UI window is taken out of focus as shown at block 606. As shown at block 608, a gaze is awaited. As shown at block 610, if no gaze has yet been received, the interface returns to 608. If a gaze is received upon a UI window, as shown at block 610, the UI window receiving the gaze is brought into focus as shown at block 612.

Figure 7:
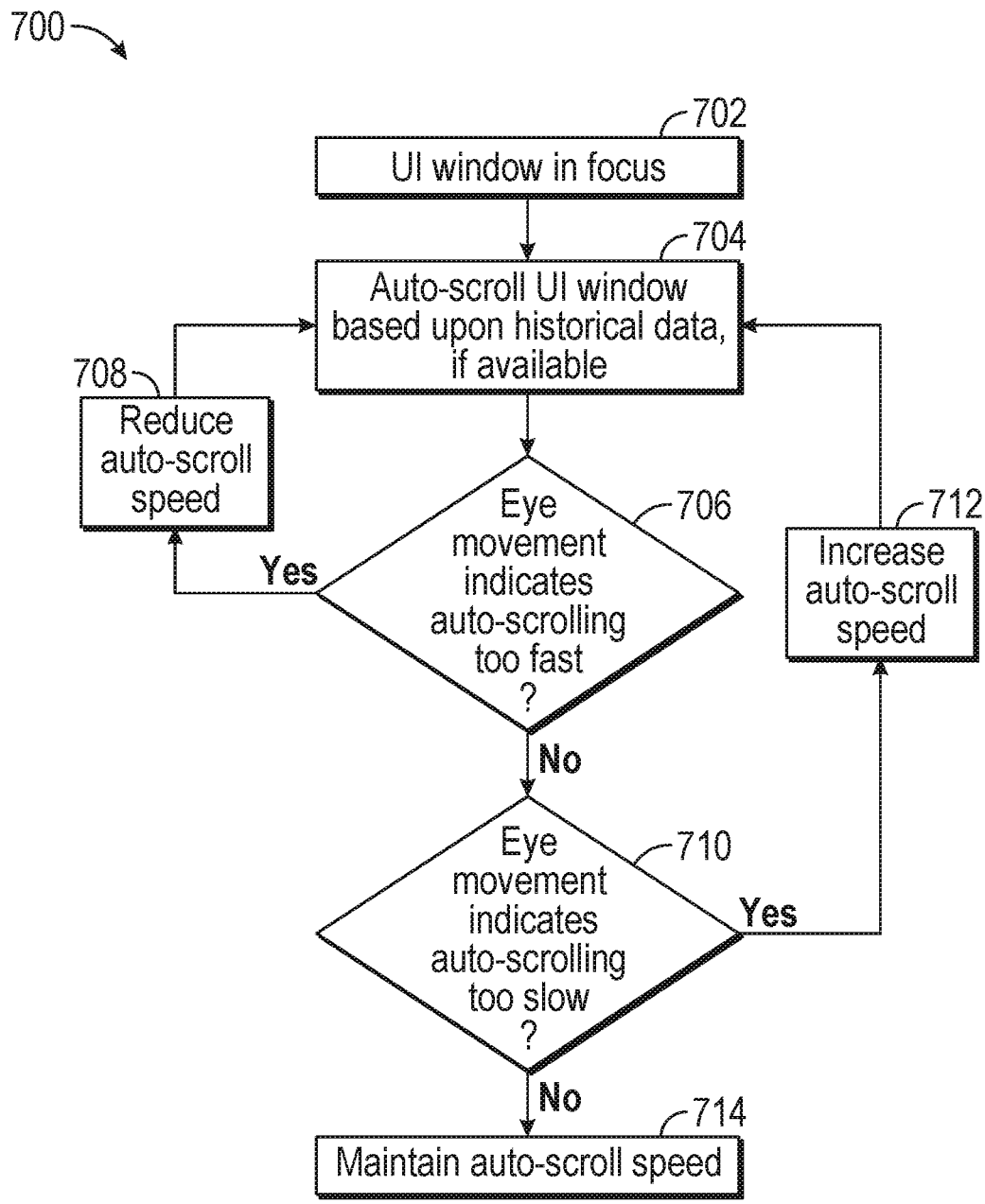
FIG. 7 is an exemplary flow chart illustrating operation of a computing device to auto-scroll an interface window.

FIG. 7 is a flow chart diagram that illustrates auto-scroll speed adjustment based upon a user eye movement. As shown at block 702, a UI window is in focus. As shown at block 704, the UI window begins an auto-scroll movement. The auto-scroll may be (for example) a vertical, horizontal, or any other type of content advancement that automatically advances for a user's reading. In addition to text, other content such as images and videos may be displayed and auto-scrolled. A user's historical data, if available, may be used to determine the auto-scroll rate. Other ways to determine an initial auto-scroll rate may include, for example, a default auto-scroll rate or session data. Auto-scroll logic may also include a predefined value for 'quick independent stops' in the scrolling experience. Scrolling, for example, may be vertical, horizontal, forward and/or backward. Session data may include, for example, any actions the user has performed since the current interactive session.

As shown at block 706, a check is performed to see whether the auto-scroll is moving too fast relative to the user's reading speed. For example, the check determines if the user's reading speed is moving too close to the top of the auto-scrolling text (if the text is scrolling downward). If the user's eye movement indicates at 706 auto-scrolling text is moving too fast (e.g., the user's gaze gets too close of the top of the auto-scrolling text), as shown at block 708 the auto-scroll speed is reduced. The auto-scroll speed reduction may be adjusted to match the current read speed, user historical data, and/or any other suitable criteria. The interface then returns to 704.

If the auto-scroll at 706 is not too fast, then as shown at block 710, a check is performed to see whether the auto-scroll is moving too slow relative to the user's reading speed. For example, the check determines if the user's reading speed is moving too close to the bottom of the auto-scrolling text (if the text is scrolling downward). If the user's eye movement indicates at 706 auto-scrolling text is moving too slow, the auto-scroll speed is increased as shown at block 712. The auto-scroll speed increase may be adjusted to match the current read speed, user historical data, and/or any other suitable criteria. The interface then returns to 704. If the auto-scroll at 706 is not too fast, then at 714 the auto-scroll speed is maintained.

The interface may automatically adjust the auto-scroll experience using data gathered from multiple users across different types of content, languages, etc. For example, the initial values (speed, duration of breaks, etc.) may be based on 'optimal' values derived from usage data from highly engaged users. In another example, automatic experimentation (A/B, multivariate testing, etc.) may be used to test different auto-scroll values for different users and then pick any desired values, such as optimal values having statistical significance.

Additionally, sentiment and/or emotion capture/analysis may be performed. For example, in-document sentiment analysis and readability analysis may help determine the way content is prepared and packaged. This metadata may lead to more effective ways to present and package content (such as making content more readable, possibly more compact, using specific high-performance patterns, etc.). Continuing with the example, this may impact how content is formed (such as being delivered faster, given the insights derived from the metadata), and/or how content is distributed (e.g., more efficiently according to 2-level personalization. For example, this may result in less bandwidth being consumed, such as due to the compact nature of the data/content.

In some examples, as a user interacts with UI windows (by any means, including gaze) the interface submits metadata and adjusts the underlying analytical models serving the user's needs and preferences, such as in terms of content and content presentation. Continuing with the example, the data may be aggregated and analyzed within the context of the specific user, as well as against specific user profiles, segments, markets and additional dimensions. The interface may learn and predict which content may be more appreciated by the user at any given time point, which may vary over time. Put another way, the same user may consume different types of content during weekdays vs weekends, mornings vs evenings, when at home vs on trip, etc. Moreover, the interface may have the ability to make associations among different categories of content given a specific item as an entry point (e.g., if the user started the experience with sports>politics>news then the next best content to be promoted may be 'life style'). The interface may use some or all information (and/or additional information) provided by the underlying model in order to get initialized for a specific user. For example, when an initial personalized experience is provided, the interface may utilize information that describes what attracts a user's attention in order to provide a second layer of 'just-in-time' personalization, such as when a user looks at a car-themed UI window for a long time and consumes the content served through the UI window. Although cars may not be the favorite category for the specific user, it is determined that there is strong interest by the user, at least at this particular moment. The interface may then silently (seamlessly) adapt by providing more content related to cars and also directly and/or indirectly related categories (such as car industry car news, car reviews, etc.). Continuing with this example, the interface may serve this content via the UI window user is gazing at, and/or through other visible UI windows. In some examples, such content may be queued in any UI window (whether the currently in-focus UI window, or not) without being visible to the user at that time.

Additional Examples

Some examples are directed to systems, methods, and computer-storage media for enabling a user to navigate between content using gaze tracking, through the following. A presentation component presents a plurality of content to a user in user interface (UI) windows. A camera captures a gaze of the user. Memory storing instructions for detecting the gaze of the user and controlling focus of the UI windows are presented to the user based on the gaze. A processor is programmed for tracking the gaze of the user and determining a first gaze point in a first of the UI windows corresponding to the gaze of the user. Where the first gaze point is located in the first of the UI windows, the first of the UI windows is displayed in a focused manner.

Some examples are directed to systems, methods, and computer-storage media for controlling the display of content on a computing device through tracking of a user gaze, through the following operations. A collection of digital content is presented in user interface (UI) windows. The gaze of the user is monitored. Gaze points are tracked with respect to the content collection based on the monitored gaze of the user. One or more UI windows are displayed covering the gaze points in a focused manner. One or more UI windows not covering the gaze points are displayed in an unfocused manner.

Some examples are directed to systems, methods, and computer-storage media for controlling interaction with content on a computing device, through performing several executable operations. A collection of digital content is presented to the user in user interface (UI) windows. A face of a user is monitored. Gaze points on the screen are located corresponding to the monitored face of the user. A UI window covering the gaze points is displayed in a focused manner. The content in the UI window displayed in the focused manner is interacted with as the gaze points move inside the UI window. User interaction may, for example, be measured/observed/differentiated where a user glanced at a display comprising multiple UI windows, as compared with a user having three continuous minutes of interaction with one or more of the UI windows.

Alternatively or in addition to the other examples described herein, examples include any combination of the following:
  continuing to track the gaze of the user;
  determining a second gaze point in a second of the UI windows corresponding the gaze of the user;
  incident to the second gaze point being located in the second of the UI windows, displaying the second of the UI windows in a focused manner;
  differentiating a glance from a gaze by comparing gaze time to a time threshold;
  removing focus from a UI window upon removal of the gaze from the UI window;
  auto-scrolling content in a UI window being displayed in a focused manner;
  utilizing a scroll rate based upon the gaze of the user;
  utilizing a scroll rate that is based upon historical data based upon the user;
  storing analytics with respect to a portion of content based upon a change in the user's viewing speed with respect to the portion of content;
  switching focus from a first UI window to a second UI window corresponding to the gaze points moving from the first UI window to the second UI window;
  tracking eye movements of the user;
  identifying an animation control in at least one of the UI windows displayed in a focused manner;
  automatically starting the animation control in response to the gaze points being within a specific area of the at least one of the UI windows;
  playing a video in the at least one of the UI windows;
  playing audio in the at least one of the UI windows;
  scrolling through content in the at least one of the UI windows;
  selecting a hyperlinked data in the at least one of the UI windows;
  content auto-scrolling is based upon session data;
  content is delivered to UI windows based upon historical data;
  content targeted to the user is delivered without being based upon historical data;
  monitoring the face of the user through the camera comprises:
  performing facial recognition to determine a gaze direction of the user;
  identifying the gaze points based on the gaze direction determined through facial recognition;
  adding updated content in one or more UI windows based upon the gaze location of the user; and
  analyzing the gaze location relative to the location of the updated content.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Exemplary computer storage media include hard disks, flash drives, and other solid-state memory. Communication media embody data in a signal, such as a carrier wave or other transport mechanism, and include any information delivery media. Computer storage media and communication media are mutually exclusive.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein.

Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for presenting an adaptive eye-tracking interface. For example, the elements illustrated in FIGS. 1 and 2, such as when encoded to perform the operations illustrated in FIGS. 3-7, constitute exemplary means for presenting a collection of digital content in user interface (UI) windows, monitoring the gaze of the user, tracking gaze points with respect to the collection based on the monitored gaze of the user, displaying the UI windows covering the gaze points in a focused manner; and/or displaying the UI windows not covering the gaze points in an unfocused manner.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, media, and methods without departing from the scope of aspects of the disclosure, it is intended that all matter contained in the above description and shown in the accompanying drawings shall be interpreted as illustrative and not in a limiting sense.

What is claimed is:

1. A device for enabling a user to navigate between content using gaze tracking, the device comprising:
    a presentation component for presenting a plurality of content to a user in user interface (UI) areas;
    a camera for capturing a gaze of the user;
    memory storing instructions for detecting the gaze of the user and controlling focus of the UI areas presented to the user based on the gaze; and a processor programmed for:
    receiving content to present to the user in the UI areas, the content comprising a plurality of applications to be presented in the UI areas;
    selecting content comprising different applications to present the user;
    presenting each of the plurality of applications of the selected content in each of the UI areas;
    tracking the gaze of the user relative to the plurality of applications presented in the UI areas;
    determining a first gaze point in a first of the UI areas corresponding to the gaze of the user;
    incident to the first gaze point being located in the first of the UI areas, displaying an application the first of the UI areas in a focused manner while also displaying the plurality of applications in other UI areas not covering the gaze point in an unfocused manner; and
    performing automatic scrolling of text in the first of the UI area,
    wherein said automatic scrolling moves the text at a speed that is based upon historical data of the user reading text in one of the different applications in the other UI areas presented in the unfocused manner.

2. The device of claim 1, wherein the processor is programmed for:
    continuing to track the gaze of the user;
    determining a second gaze point in a second of the UI areas corresponding the gaze of the user; and
    incident to the second gaze point being located in the second of the UI areas, displaying the second of the UI areas in a focused manner.

3. The device of claim 1, wherein the processor is programmed for differentiating a glance from a gaze by comparing gaze time to a time threshold.

4. The device of claim 1, wherein the processor is programmed for removing focus from the first UI area upon detection of removal of the gaze from the first UI area.

5. The device of claim 1, receiving voice data from the user interacting with the first of the UI areas displayed in the focused manner.

6. The device of claim 5, wherein said voice data comprises a command to play a video in the first UI window.

7. The device of claim 5, further comprising executing an operation on content in the first of the UI areas displayed in the focused manner based on the voice data from the user while the other UI areas with the different applications are displayed in the unfocused manner.

8. The device of claim 1, wherein the processor is programmed for storing analytics with respect to a portion of content based upon a change in the speed the text is moved.

9. A method for controlling the display of content on a computing device through tracking of a user gaze, comprising:
    establishing a content-viewing session on the computing device for a user;
    selecting a collection of digital content comprising different applications to present the user based, at least in part, on
    gaze information of the user from one or more previous viewing sessions;
    presenting the selected collection of digital content, in user interface (UI) areas on a display device;
    monitoring the gaze of the user;
    tracking gaze points with respect to the selected collection of the digital content in the UI areas based on the monitored gaze of the user;
    displaying an application in a first UI area covering the gaze points in a focused manner while also displaying a plurality of applications in other UI areas not covering the gaze points in an unfocused manner;
    performing automatic scrolling of text in the application of the first UI area, wherein said automatic scrolling moves the text at a speed that is based upon historical data of the user reading text in one of the different applications in the other UI areas presented in the unfocused manner.

10. The method of claim 9, further comprising switching focus from the first UI area to a second UI area corresponding to the gaze points moving from the first UI area to the second UI area.

11. The method of claim 9, wherein said monitoring of the gaze of the user comprises tracking eye movements of the user.

12. The method of claim 9, wherein a first application in the first UI area is a video application and a second application in one of the different UI areas is a web page.

13. The method of claim 9, wherein content is delivered to UI areas based upon historical data of the user's gaze.

14. The method of claim 9, wherein the content is selected based, at least in part, on an identify of the user.

15. One or more computer-storage media embodied with executable instructions for controlling interaction with content on a computing device, further comprising:
    establishing a content-viewing session on the computing device for a user;
    selecting a collection of digital content comprising different applications to present the user based, at least in part, on the gaze information of the user from the one or more previous viewing sessions,
        presenting the selected collection of digital content to the user in user interface (UI) areas;
    monitoring one or more eyes a user;
    locating gaze points on the screen corresponding to the monitored one or more eyes of the user;
    displaying an application in a first UI area covering the gaze points in a focused manner relative to other UI areas that are presented in an unfocused manner
    enabling the user to interact with the content in the UI area displayed in the focused manner;
    performing automatic scrolling of text in the application of the first UI area,
    wherein said automatic scrolling moves the text at a speed that is based upon historical data of the user reading text in one of the different applications in the other UI areas presented in the unfocused manner.

16. The computer-storage media of claim 15, wherein said monitoring the one or more eyes of the user comprises:
    performing facial recognition to determine a gaze direction of the user; and
    identifying the gaze points based, at least in part, on the gaze direction determined through facial recognition.

17. The computer-storage media of claim 15, further comprising adding updated content in one or more UI areas based upon the gaze location of the user.

18. The computer-storage media of claim 17, wherein updating content in one or more UI areas based upon the gaze location of the user further comprises analyzing the gaze location relative to the location of the updated content.

* * * * *